(No Model.) 2 Sheets—Sheet 2.
S. M. MEYER.
ELECTRICAL LIGHTER FOR BURNERS.
No. 595,327. Patented Dec. 14, 1897.
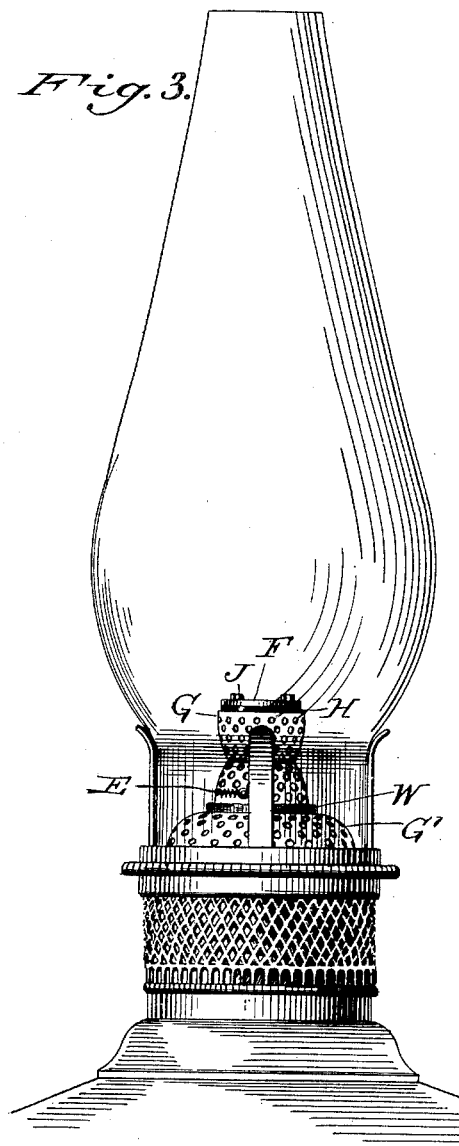
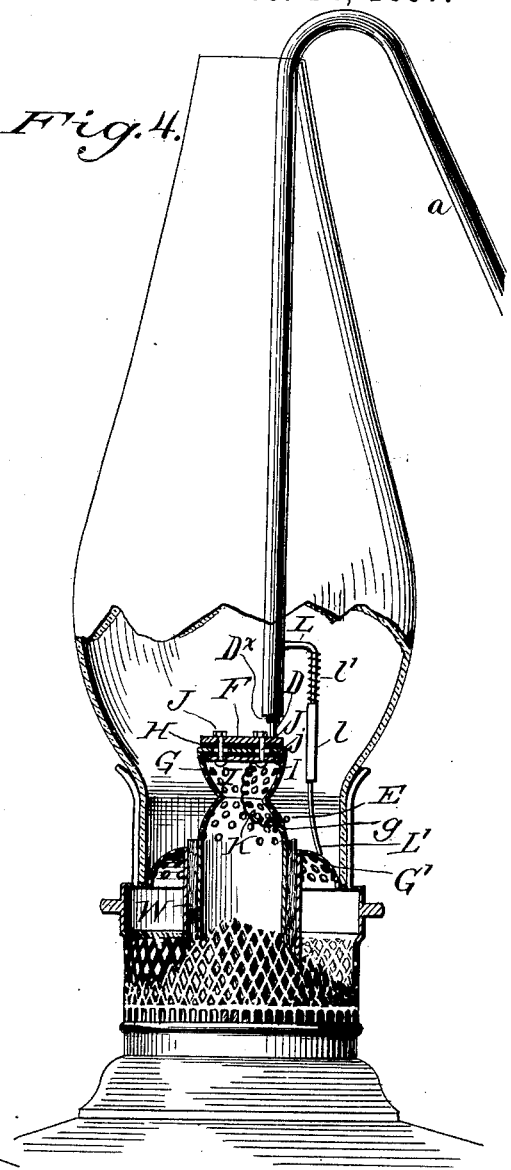
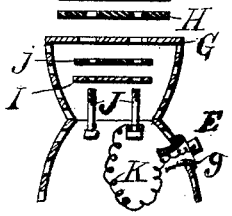
WITNESSES,
INVENTOR,
Svend M. Meyer
By Octavius Knight
Asso. ATTORNEY.

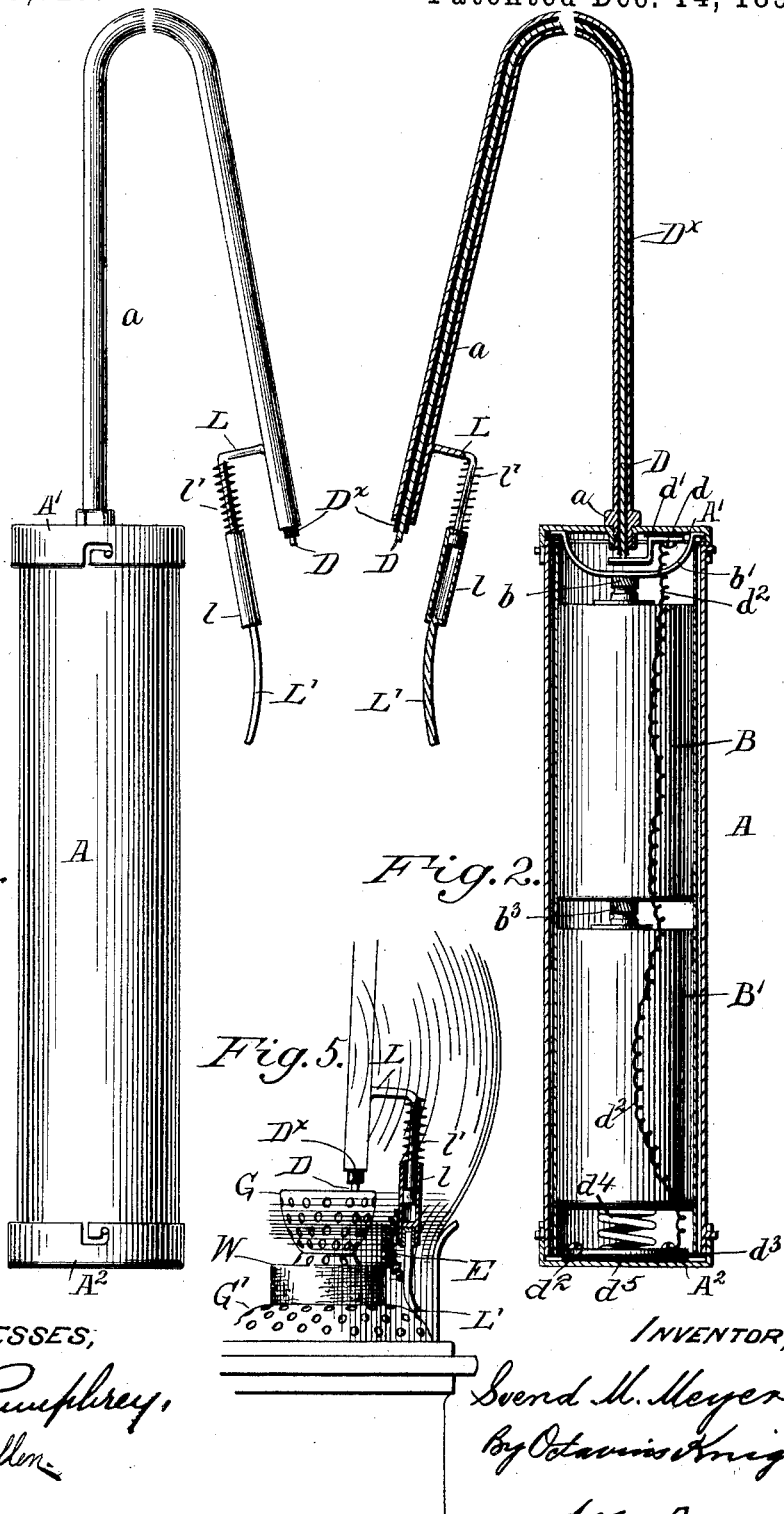

UNITED STATES PATENT OFFICE.

SVEND MARTIN MEYER, OF BROOKLYN, NEW YORK, ASSIGNOR TO THE EMPIRE SELF LIGHTING OIL LAMP COMPANY, OF NEW JERSEY.

ELECTRICAL LIGHTER FOR BURNERS.

SPECIFICATION forming part of Letters Patent No. 595,327, dated December 14, 1897.

Application filed November 6, 1896. Serial No. 611,279. (No model.)

*To all whom it may concern:*

Be it known that I, SVEND MARTIN MEYER, a citizen of the United States, and a resident of Brooklyn, in the county of Kings and State of New York, have invented a certain new and useful Electrical Lighter for Kerosene and other Burners, of which the following is a specification.

The subject of my invention is an electrical apparatus for lighting oil-lamps and other burners, the said lighting apparatus containing a suitable battery and conductors and being so constructed that the circuit will be closed by the application of the lighting apparatus to the lamp and will render incandescent the resistance-coil in the circuit thus closed.

In the accompanying drawings, Figure 1 is an elevation of an electrical lighting apparatus, illustrating my invention. Fig. 2 is a longitudinal section of the same, showing the batteries and some other parts in elevation. Fig. 3 is an elevation of a lamp-burner adapted for the use of my electrical lighting apparatus. Fig. 4 is a vertical section of the lamp-burner, showing the electrical lighting apparatus applied thereto for igniting the wick. Fig. $4^a$ is a sectional diagram of some of the parts of the burner separated. Fig. 5 is a sectional view illustrating a modification.

A represents a suitable casing with removable heads A' A$^2$ and containing batteries B B'. On the removal of either of the heads A' A$^2$ the batteries B B' may be slipped out the case from the lower or upper end, as the case may be. When the batteries are in position within the case, the carbon $b^3$ of the battery B' communicates with the external zinc cell of the battery B and the carbon $b$ of the battery B connects with a contact-plate $b'$ in electrical connection with the removable head A'.

A hollow metal stem $a$ is screwed into the head A' and contains a conducting wire or rod D, separated from the wall of the stem by an insulating-envelop D$^\times$. The hollow stem $a$ and its conducting-rod D take the form of a gooseneck, as shown in Figs. 1 and 4, so as to adapt the extremity of the said stem to be introduced within the lamp-chimney, as illustrated in Fig. 4, and to reach the burner. The conductor D projects beyond the extremity of the crooked stem $a$ to make contact with a plate F, applied to the top of the customary air-distributing cone or shell G of the lamp-burner and insulated therefrom by a body of mica or other suitable non-conducting material H and connected, electrically and mechanically, with a conducting-plate I, within the shell or cone G, by means of small bolts J, passing through apertures in the top of the shell G, of sufficient size to prevent electrical contact, the plate H being also insulated from the shell G by a plate $j$ of mica or other suitable non-conducting material. The conducting-wire K, attached to the plate I, is passed through an insulating-thimble $g$ in the base of the cone G and connected on the outside with an insulating-coil E of platinum wire, the other extremity of which is in electrical connection with the body of the cone G.

On the exterior of the hollow stem $a$, near its lower end, is fixed a conducting-rod L, of metal, the end L' of which connects, telescopically, with the fixed portion, so as to adapt it to be forced in by pressure from the end, and within the telescope joint or socket $l$ is a spring $l'$, adapted to force outward the projecting end L' of the conducting-rod. This projecting end L' of the conducting-rod is in position to make contact with the skirt G' of the lamp-burner, as shown in Fig. 4.

The inner end of the conducting-rod D, at the base of the hollow stem $a$ and beneath the head A', connects with a contact-plate $d$, mechanically attached to the head A', but electrically insulated therefrom by a non-conducting plate $d'$. The said contact-plate $d'$ is connected by a conducting-wire $d^2$ with a plate $d^3$, within the lower head A$^2$, which plate is insulated from the said head by a non-conducting plate $d^5$ and makes electrical contact with the base of the battery B' by means of a spring $d^4$.

From the above description it will be apparent that when the lighting device is introduced in the lamp-chimney, as shown in Fig. 4, and brought down in contact with the burner the extremity of the conducting-wire D, forming a contact with the insulated plate F, and the extremity of the conducting-rod L', being forced down on the skirt G' of the lamp-burner, the electric circuit will be closed through the batteries B B' and by means of the rods or screws J, conducting-plate I, and wire K through the resistance-coil E, which is thus made incandescent by the electric current, and being located in close proximity to the lamp-wick W ignites the wick.

In Fig. 5 I have shown a modification in which the incandescent coil is introduced in the removable lighter instead of being applied to the cone of the lamp-burner.

Having thus described my invention, the following is what I claim as new therein and desire to secure by Letters Patent:

1. The combination of the case A, batteries B B', conductors $d$, $d'$, $d^2$, $d^4$, $a$ and L with the metallic lamp-cone G G' and the resistance-coil E in the circuit which is closed by the application of the lighter to the lamp-burner, substantially as herein described.

2. The combination of the conductors $a$, L and D and a conducting-rod $l$ L of variable length to adapt the apparatus to form contact with separate parts of the lamp-burner for the purpose of closing a circuit through the resistance-coil E, substantially as described.

SVEND MARTIN MEYER.

Witnesses:
B. A. ITTNER,
OCTAVIUS KNIGHT.